(12) United States Patent
Wu

(10) Patent No.: US 10,197,361 B1
(45) Date of Patent: Feb. 5, 2019

(54) MULTI-PURPOSE RETICLE

(71) Applicant: Hi-Lux, Inc., Torrance, CA (US)

(72) Inventor: Christopher Wu, Torrance, CA (US)

(*) Notice: Subject to any disclaimer, the term of this patent is extended or adjusted under 35 U.S.C. 154(b) by 0 days.

(21) Appl. No.: 15/806,743

(22) Filed: Nov. 8, 2017

(51) Int. Cl.
*F41G 1/38* (2006.01)
*G02B 27/32* (2006.01)

(52) U.S. Cl.
CPC .............. *F41G 1/38* (2013.01); *G02B 27/32* (2013.01)

(58) Field of Classification Search
CPC ..................................................... G02B 27/32
USPC ............................................ 42/122; D22/109
See application file for complete search history.

(56) References Cited

U.S. PATENT DOCUMENTS

| | | | | |
|---|---|---|---|---|
| 1,708,389 A | * | 4/1929 | Karnes | F41G 3/00 89/41.22 |
| 8,353,454 B2 | * | 1/2013 | Sammut | F41G 1/38 235/404 |
| 8,959,824 B2 | * | 2/2015 | Sammut | F41G 1/38 42/122 |
| D755,269 S | * | 5/2016 | Pride | D16/130 |
| 10,042,177 B1 | * | 8/2018 | Pitera et al. | G02B 27/32 |
| 2007/0022651 A1 | * | 2/2007 | Verdugo | F41G 1/345 42/130 |
| 2015/0362288 A1 | * | 12/2015 | Sammut | F41G 3/08 235/404 |
| 2017/0102209 A1 | * | 4/2017 | Byars | F41G 1/393 |
| 2017/0102553 A1 | * | 4/2017 | Plumb | F41G 1/473 |
| 2017/0123224 A1 | * | 5/2017 | Hamilton | F41G 1/38 |

* cited by examiner

*Primary Examiner* — Gabriel J. Klein
(74) *Attorney, Agent, or Firm* — Clement Cheng

(57) ABSTRACT

A multipurpose reticle has a transparent body that the reticle is marked onto; a primary horizontal crosshair; a secondary horizontal crosshair below the primary horizontal crosshair and parallel to the primary horizontal crosshair; a projectile holdover reference grid between the primary horizontal crosshair and the secondary horizontal crosshair; and a vertical crosshair beginning from the primary horizontal crosshair and extending downwardly to the secondary horizontal crosshair. The vertical crosshair is a shared vertical crosshair. The vertical crosshair bisects the projectile holdover reference grid such that the right half of the projectile holdover reference grid is to the right of the vertical crosshair and the left half of the projectile holdover reference grid is to the left of the vertical crosshair.

14 Claims, 1 Drawing Sheet

U.S. Patent
Feb. 5, 2019
US 10,197,361 B1
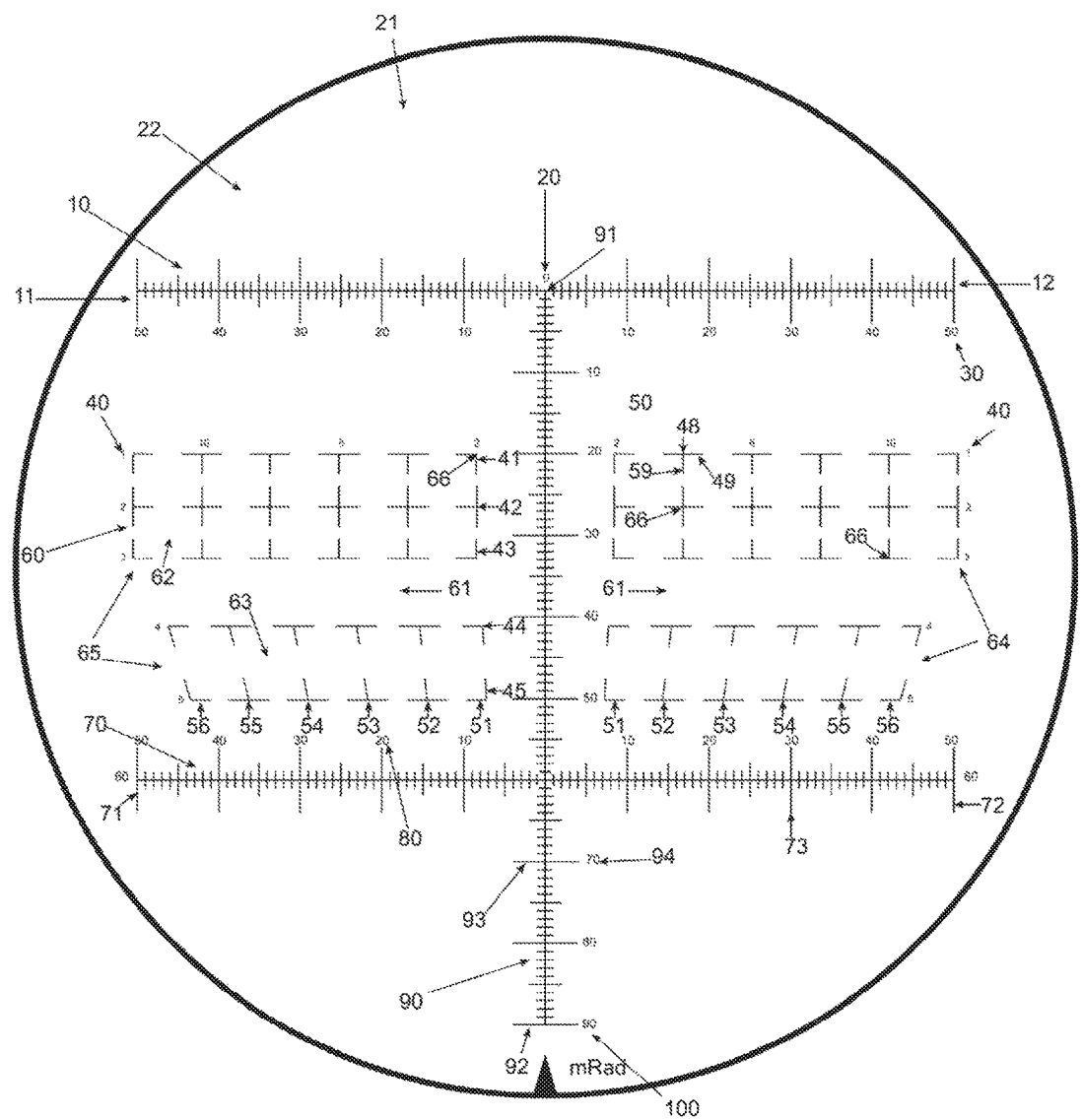

MULTI-PURPOSE RETICLE

FIELD OF THE INVENTION

The present invention relates to to telescopic optics for use with small arms such as rifles, pistols, and other platforms, and more specifically to the reticle design for use in telescopic optics.

DISCUSSION OF RELATED ART

A variety of different weapon systems ranging from small arms in common calibers such as 5.56 NATO, 7.62×39R to non-standard small arm ammunition such as RPG rounds use a telescopic optics system for targeting. The reticle is a part of the telescopic optics system.

SUMMARY OF THE INVENTION

A multipurpose reticle has a transparent body that the reticle is marked onto; a primary horizontal crosshair; a secondary horizontal crosshair below the primary horizontal crosshair and parallel to the primary horizontal crosshair; a projectile holdover reference grid between the primary horizontal crosshair and the secondary horizontal crosshair; and a vertical crosshair beginning from the primary horizontal crosshair and extending downwardly to the secondary horizontal crosshair. The vertical crosshair is a shared vertical crosshair. The vertical crosshair bisects the projectile holdover reference grid such that the right half of the projectile holdover reference grid is to the right of the vertical crosshair and the left half of the projectile holdover reference grid is to the left of the vertical crosshair.

Each of the vertical and horizontal crosshairs has optical points of intersection at 0 Mils and 60 Mils on the shared vertical crosshair, a series of aiming points, wherein aiming points comprises of an intersection of two line segments at right angles or oblique angles. The vertical crosshair includes a series of predetermined mil gradients. The vertical crosshair preferably has of a series of mil gradients, with every fifth mil gradient is larger than its adjacent gradients. The horizontal crosshair preferably has a series of mil gradients.

The horizontal crosshair has a series of mil gradients, with every fifth mil gradient larger than its adjacent gradients. Each half of the projectile holdover reference grid has a series of projectile holdover aiming points. The projectile holdover aiming points are formed by intersecting line segments. The series of aiming points are arranged into three rows and six columns of perpendicular intersecting line segments on both sides of the vertical crosshair. The projectile holdover distance indices mark their respective rows namely a projectile holdover first row, a projectile holdover second row, and a projectile holdover third row.

The series of aiming points also can have a projectile holdover fourth row and a projectile holdover fifth row having intersecting line segments that form oblique angles.

The series of aiming points of the projectile holdover first row are equidistantly spaced, and the vertical line segments extend below horizontal line segments at a point of intersection. The series of aiming points of the projectile holdover second row are equidistantly spaced, and each horizontal line segment of the projectile holdover second row bisects each vertical segment of the projectile holdover second row.

The series of aiming points of the projectile holdover third row are equidistantly spaced. Each horizontal line segment of the projectile holdover third row bisects each vertical segment of the projectile holdover third row. The vertical line segments of the projectile holdover third row extend upwardly from the horizontal line segments of the projectile holdover third row.

The series of aiming points of the projectile holdover fourth row are not equidistantly spaced and the vertical line segments of the projectile holdover fourth row extend downwardly from an intersection from the horizontal line segments of the projectile holdover fourth row. The series of aiming points of the projectile holdover fifth row are formed as intersecting line segments of oblique angles. Vertical line segments of the projectile holdover fifth row extend above horizontal line segments of the projectile holdover fifth row from the point of intersection. All five rows of intersecting line segments are configured for trajectory and windage compensation of RPG rounds from 100m-500m.

BRIEF DESCRIPTION OF THE DRAWINGS

FIG. 1 is a diagram showing the reticle of the present invention.

The following call out list of elements can be a useful guide in referencing the elements of the drawings. The call out numbers are in italics since the diagram of the reticle also has numbers as part of the invention.

10 Primary Horizontal Crosshair
11 Primary Horizontal Crosshair Left End
12 Primary Horizontal Crosshair Right End
20 Aiming Point Reference
21 Transparent Body
22 Reticle
30 Primary Windage Index Numbers
40 Projectile Holdover Distance Indices
41 Projectile Holdover First Row
42 Projectile Holdover Second Row
43 Projectile Holdover Third Row
44 Projectile Holdover Fourth Row
45 Projectile Holdover Fifth Row
48 Intersection
49 Horizontal Line Segment
50 Projectile Crosswind Holdover Indices
51 Projectile Crosswind First Column
52 Projectile Crosswind Second Column
53 Projectile Crosswind Third Column
54 Projectile Crosswind Fourth Column
55 Projectile Crosswind Fifth Column
56 Projectile Crosswind Sixth Column
59 Vertical Line Segment
60 Projectile Holdover Reference Grid
61 Projectile Holdover Reference Grid Gap
62 Orthogonal Grid Portion
63 Trapezoidal Grid Portion
64 Right Half Of The Projectile Holdover Reference Grid
65 Left Half Of The Projectile Holdover Reference Grid
66 Projectile Holdover Aiming Points
70 Second Horizontal Crosshair
71 Secondary Horizontal Crosshair Left End
72 Secondary Horizontal Crosshair Right End
73 Secondary Horizontal Crosshair Major Section Lines
80 Second Windage Index Numbers
90 Vertical Crosshair
91 Vertical Crosshair Upper End
92 Vertical Crosshair Lower End 93 Vertical Crosshair Major Section Lines
94 Vertical Crosshair Numerical Indices
100 Elevation Index Numbers

DETAILED DESCRIPTION OF THE PREFERRED EMBODIMENT

On a transparent body 21, a reticle 22 can be formed. The primary horizontal crosshair 10 intersects with the vertical crosshair 90. The vertical crosshair 90 has a vertical crosshair upper end 91 which is the aiming point reference 20. The vertical crosshair 90 also has a vertical crosshair lower end 92. The secondary horizontal crosshair 70 intersects the vertical crosshair 90. The secondary horizontal crosshair 70 is parallel to the primary horizontal crosshair 10. The primary horizontal crosshair 10 has a primary horizontal crosshair left end 11 and a primary horizontal crosshair right end 12. The secondary horizontal crosshair 70 has a secondary horizontal crosshair left end 71 and a secondary horizontal crosshair right end 72. The secondary horizontal crosshair left end 71 generally aligns to the primary horizontal crosshair left end 11 and the secondary horizontal crosshair right end 72 generally aligns to the primary horizontal crosshair right end 12.

The secondary horizontal crosshair 70 has secondary windage index numbers 80. The secondary windage index numbers 80 start at an extend laterally from the vertical crosshair 90. The index numbers are preferably "10", then "20", then "30", then "40", then "50" in a row above the secondary horizontal crosshair 70. The index numbers are preferably marked directly above secondary horizontal crosshair major section lines 73.

The projectile holdover reference grid 60 is placed between the primary horizontal crosshair 10 and the secondary horizontal crosshair 70. The projectile holdover reference grid 60 has a projectile holdover reference grid gap 61. The projectile holdover reference grid 60 has projectile holdover distance indices 40 aligned on the left and right sides of the projectile holdover reference grid 60. The projectile crosswind holdover indices 50 are above the projectile holdover reference grid. The projectile crosswind holdover indices are preferably numbered "2", "6", and "10" which represent increasing wind speed to the left or right of the vertical crosshair 90. The crosswind affects projectiles and can be compensated by using the projectile holdover reference grid. A generally orthogonal grid portion 62 is above a trapezoidal grid portion 63. Therefore, the holdover projectile indicator has cross wind numbers along a horizontal top line and the holdover projectile indicator has range numbers along a vertical side line. The projectile holdover reference grid preferably has vertical broken line segments and horizontal broken line segments to provide accent on vertices only.

The vertical crosshair bisects the projectile holdover reference grid 90 such that the right half of the projectile holdover reference grid 64 is to the right of the vertical crosshair and the left half of the projectile holdover reference grid 65 is to the left of the vertical crosshair. The projectile holdover reference grid 90 has projectile holdover aiming points 66. The projectile holdover first row 41 is at the top where the projectile crosswind holdover indices 50 are located. Thus, the projectile holdover distance indices 40 markout their respective rows namely the, projectile holdover first row 41, projectile holdover second row 42, projectile holdover third row 43, projectile holdover fourth row 44, and the projectile holdover fifth row 45. Similarly, the projectile crosswind holdover indices 50 include a projectile crosswind first column 51, projectile crosswind second column 52, projectile crosswind third column 53, projectile crosswind fourth column 54, projectile crosswind fifth column 55, projectile crosswind sixth column 56. Intersections 48 of the rows and columns are made by horizontal line segments 49 that define the rows intersecting with vertical line segments 59 that define the columns.

The vertical crosshair 90 bisects the projectile holdover reference grid 60. The vertical crosshair 90 has vertical crosshair major section lines 93 where vertical crosshair numerical indices 94 are marked. Preferably, the vertical crosshair numerical indices begin from "0" at the aiming point reference 20 and increase by ten for each successive vertical crosshair major section line 93 below the aiming point reference 20. With nine vertical crosshair major section lines 93, the numerical indices range from zero to "90".

A key feature of this invention is that the double horizontal crosshairs and range fields allow use as an rpg rifle or optical range finder and therefore the reticle is highly multi purpose. During use, the reticle is useful for initially calibrating the scope by using the main sight in point, where the upper horizontal and vertical crosshair intersect, rangefinding known sized targets, and as a multi-point aiming device, accounting for trajectories for various distances or to adjust for the presence of a cross-wind or a combination of both the movement of the target and crosswind.

The reticle can be etched into a transparent hard body, such as optical plastic or glass, and the reticle can be incorporated into an optical scope. A portion or the entire etched reticle may be applied with a reflective coating so that the reticle may be illuminated by reflecting light from a LED or other light source. The illuminated reticle will provide for enhanced contrast with the surroundings in the sight picture, allowing for better performance in low light conditions.

The main sight in point is the intersection of the upper horizontal crosshair and shared vertical crosshair. There is also a 0 indexed above the main sight-in point of the multipurpose reticle. The multipurpose reticle assists the operator in multiple ways: Rangefinding known sized targets using the Mil Relationship Theory, trajectory compensation for small arms using the vertical and horizontal Mil scales, trajectory and wind compensation for RPG rounds using the rows of intersecting line segments.

The invention claimed is:

1. A multipurpose reticle comprising:
   a. a transparent body that the reticle is marked onto;
   b. a primary horizontal crosshair;
   c. a secondary horizontal crosshair below the primary horizontal crosshair and parallel to the primary horizontal crosshair;
   d. a projectile holdover reference grid between the primary horizontal crosshair and the secondary horizontal crosshair configured for trajectory and wind compensation of RPG rounds, wherein the projectile holdover reference grid has a series of projectile holdover aiming points formed by perpendicularly intersecting line segments arranged along at least a first row, wherein the series of aiming points further includes aiming points formed by obliquely intersecting line segments arranged along at least another row of the reference grid, and wherein the series of aiming points are arranged on both sides of a vertical crosshair; and
   e. the vertical crosshair beginning from the primary horizontal crosshair and extending downwardly to the secondary horizontal crosshair, wherein the vertical crosshair is a shared vertical crosshair, wherein the vertical crosshair bisects the projectile holdover reference grid such that the right half of the projectile holdover reference grid is to the right of the vertical crosshair and the left half of the projectile holdover reference grid is to the left of the vertical crosshair.

2. The multipurpose reticle of claim 1, wherein each of the vertical and horizontal crosshairs has optical points of intersection at 0 Mils and 60 Mils on the shared vertical crosshair, a series of aiming points, wherein aiming points comprises of an intersection of two line segments at right angles or oblique angles.

3. The multipurpose reticle of claim 1, wherein the vertical crosshair includes a series of predetermined mil gradients.

4. The multipurpose reticle of claim 1, wherein the vertical crosshair comprises of a series of mil gradients, with every fifth mil gradient is larger than its adjacent gradients.

5. The multipurpose reticle of claim 1, wherein the horizontal crosshair comprises a series of mil gradients.

6. The multipurpose reticle of claim 1, wherein the horizontal crosshair comprises of a series of mil gradients, with every fifth mil gradient is larger than its adjacent gradients.

7. The multipurpose reticle of claim 1, wherein each half of the projectile holdover reference grid has a series of projectile holdover aiming points, wherein the projectile holdover aiming points are formed by intersecting line segments, wherein the series of aiming points are arranged into three rows and six columns of perpendicular intersecting line segments on both sides of the vertical crosshair, wherein projectile holdover distance indices mark their respective rows namely a projectile holdover first row, a projectile holdover second row, and a projectile holdover third row.

8. The multipurpose reticle of claim 7, wherein the series of aiming points further include a projectile holdover fourth row and a projectile holdover fifth row having intersecting line segments that form oblique angles.

9. The multipurpose reticle of claim 8, wherein the series of aiming points of the projectile holdover first row are equidistantly spaced, wherein vertical line segments extend below horizontal line segments at a point of intersection.

10. The multipurpose reticle of claim 9, wherein the series of aiming points of the projectile holdover second row are equidistantly spaced, wherein each horizontal line segment of the projectile holdover second row bisects each vertical segment of the projectile holdover second row.

11. The multipurpose reticle of claim 10, wherein the series of aiming points of the projectile holdover third row are equidistantly spaced, wherein each horizontal line segment of the projectile holdover third row bisects each vertical segment of the projectile holdover third row, wherein the vertical line segments of the projectile holdover third row extend upwardly from the horizontal line segments of the projectile holdover third row.

12. The multipurpose reticle of claim 11, wherein the series of aiming points of the projectile holdover fourth row are not equidistantly spaced and wherein the vertical line segments of the projectile holdover fourth row extend downwardly from an intersection from the horizontal line segments of the projectile holdover fourth row.

13. The multipurpose reticle of claim 11, wherein the series of aiming points of the projectile holdover fifth row are formed as intersecting line segments of oblique angles, wherein vertical line segments of the projectile holdover fifth row extend above horizontal line segments of the projectile holdover fifth row from the point of intersection.

14. The multipurpose reticle of claim 8, wherein all five rows of intersecting line segments are configured for trajectory and windage compensation of RPG rounds from 100m-500m.

\* \* \* \* \*